United States Patent [19]
Heidolph et al.

[11] Patent Number: 5,773,068
[45] Date of Patent: Jun. 30, 1998

[54] LEAVENING SYSTEM AND PRODUCTS THEREFROM

[75] Inventors: Barbara B. Heidolph, Wentzville; Louis A. Highfill, Washington, both of Mo.

[73] Assignee: Solutia Inc., St. Louis, Mo.

[21] Appl. No.: 603,301

[22] Filed: Feb. 20, 1996

[51] Int. Cl.$^6$ .................................................. A21D 10/00
[52] U.S. Cl. ......................... 426/551; 426/552; 426/564; 426/561; 426/562; 426/563
[58] Field of Search .................................. 426/551, 552, 426/554, 561, 562, 563

[56] References Cited

U.S. PATENT DOCUMENTS

| | | | |
|---|---|---|---|
| 1,834,747 | 12/1931 | Stokes et al. | |
| 2,630,372 | 3/1953 | Wright et al. | |
| 3,052,549 | 9/1962 | Kichline et al. | |
| 3,397,064 | 8/1968 | Matz | |
| 3,501,314 | 3/1970 | Kichline et al. | |
| 4,741,917 | 5/1988 | Lauck et al. | 426/551 |
| 4,804,553 | 2/1989 | Tieckelmann et al. | 426/551 |
| 5,153,018 | 10/1992 | Lajoie et al. | 426/551 |
| 5,405,636 | 4/1995 | Gard et al. | 426/551 |

FOREIGN PATENT DOCUMENTS 1111216  4/1968  United Kingdom.
2254993  10/1992  United Kingdom.

OTHER PUBLICATIONS

"Condensed Chemical Dictionary" Hawley 1981.
"Baking Science & Technology" Pyler 1995.
Food Technology, vol. 44, No. 4, Apr. 1990, Chicago US, pp. 80–82+85–86 +90+92, XP000133008; J.D. Dziezak: "Phosphates improve many foods".
Gmelins Handbuch Der Anorganischen Chemie, Eight Compete Newly Revised Edition, vol. 5, No. 22, 1938, Verlag Chemie–GmbH, Weinheim/Bergstr, and Berlin, DE, p. 1002 XP002021400 "Kalium" see page 1002, paragraph 2.
Nouveau Traite De Chimie Minerale, vol. 2, No. 2, 1963, Masson et Cie, Paris, pp. 504+533 XP002021401, A. Chreitien et al.: "potassium" see p. 504, paragraph 1, see p. 533.
Printout from on–line search of *SciFinder* by the American Chemical Society (ACS), Copyright 1997.
Chem. Rev. 54,891; The Alkali Orthophosphates (1954).

*Primary Examiner*—Lien Tran
*Attorney, Agent, or Firm*—Fitzpatrick, Cella, Harper & Scinto

[57] ABSTRACT

A novel leavening composition containing hemipotassium phosphate in combination with a carbonate factor. The hemipotassium phosphate is prepared by solution crystallization with removal of water.

29 Claims, No Drawings

LEAVENING SYSTEM AND PRODUCTS THEREFROM

This invention relates to novel leavening compositions and to systems employing such compositions. More particularly, the invention relates to hemipotassium phosphate exhibiting leavening action as the acid factor in baking preparations.

BACKGROUND OF THE INVENTION

Various salts of the acids of phosphoric acid, usually orthophosphoric acid or pyrophosphoric acid are commonly employed as the acid factor in combination with a carbonate factor in leavening systems. Calcium, aluminum and sodium salts, exhibiting different reaction profiles, find use as leavening acids in different applications. Sodium, aluminum and calcium salts have been widely used as the acid factor in leavening systems.

The use of sodium acid pyrophosphate as an acid factor in bakery leavening is known but an undesirable flavor has been observed. Mixing a calcium acid phosphate salt with sodium acid pyrophosphate (SAPP) has been found to reduce or eliminate the taste and also control the evolution of gas after mixing the baking ingredients. In U.S. Pat. No. 1,834,747 to Stokes et al. there is described baking powder formulas which contain the usual sodium bicarbonate together with alkaline earth metal phosphates such as monocalcium phosphate in admixture with sodium acid pyrophosphate. It is reported that the mixture results in a slowing of the evolution of carbon dioxide as compared to sodium acid pyrophosphate alone thereby allowing a more desirable reaction profile. With variation in the amounts of the various salts it is reported that the evolution of gas during leavening can be controlled to provide varied reaction profiles depending upon the requirements.

Baking powders contain as essential ingredients an acid-reacting material and sodium bicarbonate, with or without a filler. The acid-reacting materials customarily used are alum and acid salts of phosphoric acid, pyrophosphoric acid, or combinations of these materials. See U.S. Pat. Nos. 2,630,372; 3,052,549; and 3,501,314.

SUMMARY OF THE INVENTION

In accordance with this invention there is provided hemipotassium phosphate leavening agent provided by combining mono potassium orthophosphate with phosphoric acid in equal molar amounts and heated to a temperature above 100° C. The hot mixture is then placed in a vessel and agitated vigorously whereby the free water is removed as the mixture crystallizes. Potassium hemiphosphate crystallizes driving off any free water to produce a granular, free flowing, fast dissolving, dry material having less than about 0.3% free water. Hemipotassium phosphate in the form produced by the process of this invention is highly useful as a leavening agent in conjunction with a carbonate factor in the preparation of baked goods such as pancakes, angel food cake as well as other bakery goods requiring leaving.

DETAILED DESCRIPTION OF THE INVENTION

In accordance with this invention a source of potassium ion such as mono potassium phosphate is combined with phosphoric acid to produce potassium hemiphosphate. The reaction may be represented as follows:

The hemipotassium phosphate can be initially prepared by combining a potassium source other than the orthophosphate salt such as the hydroxide or other suitable potassium base. The convenience in providing the potassium by means of the orthophosphate salt is the reduction in the amount of free water introduced into the mixture. It has been found that the most efficient process employs the least amount of free water. There is usually free water present in the initial mixture from the phosphoric acid, which is typically only 85%, the remaining weight being water.

The hemiphosphate is heated by any typical means such as a jacketed vessel or oven to a temperature in the range of from about 100° C. to about 195° C. Higher temperatures may be employed, however, the hemiphosphate becomes highly corrosive at higher temperatures making the process expensive and cumbersome. Usually, the initial mixture typically of mono potassium orthophosphate and phosphoric acid is heated to a temperature in the range of from about 105° C. to about 120° C. The mixture is usually heated for a period of from 1.5 to about 2 hours. After undergoing the heating step, the hemiphosphate still contains free water and is relatively fluid.

The hot liquid is then placed into a suitable mixing device which is capable of providing vigorous agitation and also preferably containing cooling means. As the liquid cools, crystals of potassium hemiphosphate form, first at the sides of the vessel and then throughout the mixture. Continued agitation and cooling provides an increasingly viscous slurry of crystals and with continuous, vigorous stirring the entire contents of the vessel becomes crystalline, driving off substantially all of the free water. As the contents of the mixing vessel cools to a range of from about 25° C. to about 40° C. the material becomes a free flowing powder. Immediately after cooling and crystallization, the powder can be placed in containers and shipped as substantially dry powder. It has been found that the process of this invention provides crystallized hemipotassium phosphate having less than 0.3% free water, by weight. Surprisingly, the free water contained in the initial mixture, after heating, is removed at ambient room conditions (25° C., standard pressure) during the crystallization step without special devices or removal steps. Thus, although the crystallized hemipotassium phosphate is found to contain very little free water, no special devices or process steps are required to achieve this result.

The hemipotassium phosphate of this invention has been found to be somewhat hygroscopic at higher temperatures during extended exposure to humid air. For example, after 24 hrs. of exposure at 30° C. and 74.9% relative humidity, weight gain was in the range of from 2.5% to 2.8% while exposure extending for 70 hrs. provided a weight gain of from 10.6% to 11.6%.

The dried, sized hemipotassium phosphate of this invention are employed as the acid factor in leavening systems in typical application with a carbonate factor. Carbonate factors include any suitable basic materials such as sodium bicarbonate as well as other basic materials such as potassium bicarbonate, amorphous calcium carbonate, ammonium bicarbonate, or encapsulated bicarbonate and the like.

It has been found that approximately 140 parts, by weight, of the hemipotassium phosphate of this invention is employed to neutralize 100 parts, by weight, sodium bicarbonate. Appropriate amounts of the hemipotassium phosphate useful in various leavening systems are easily calculated in view of the above. Other amounts may be employed to provide particular desired finished product characteristics. Suitable weight ratios of the leavening acid of this invention to several carbonate factors is in the range of from about 0.91 to about 1.49 preferably from about 1.18 to about 1.49 for most baked goods.

There is provided chemical leavening systems for baked goods in accordance with this invention by combining leavening acid of this invention as the acid factor with a suitable carbonate factor. Carbonate factors useful in accordance with this invention are those previously known.

The hemipotassium phosphate of this invention can be employed in admixture with other previously known leavening acids which include, without limitation, monosodium dihydrogen phosphate; dimagnesium phosphate; sodium aluminum phosphate acidic; a mixture of sodium aluminum phosphate acidic with aluminum sulphate anhydrous; a mixture of sodium aluminum phosphate acidic with anhydrous coated monocalcium phosphate; monocalcium phosphate; dicalcium phosphate dihydrate, anhydrous monocalcium phosphate, coated; monoammonium phosphate; diammonium phosphate; sodium acid pyrophosphate; monosodium phosphate and sodium acid pyrophosphate blends; citric acid; adipic acid; mixtures of monocalcium phosphate and sodium acid pyrophosphate; mixtures of sodium aluminum sulphate and monocalcium phosphate; monocalcium phosphate, anhydrous; fumaric acid; monocalcium phosphate and sodium aluminum phosphate mixtures; glucono-Δ-lactone; monopotassium tartrate; sodium aluminum sulfate; aluminum sulfate and any other suitable, edible, non-toxic acid. Further, coated or encapsulated acids are useful. Typical coatings known in the art are fats, maltodextrin, etc.

The chemical leavening system of this invention may be incorporated into a baking powder product conveniently prepared by admixing leavening acid of this invention with a carbonate factor as a dry powder mix alone or in combination with other acidulants (for example, SAPP and sodium aluminum sulfate). It is well known that baking powders in the dry powder form are best prepared together with fillers contributing to the bulk of the powder and aiding its measurement for actual use. Fillers such as starch or calcium carbonate are generally employed in baking powders of this invention. Conventional preservatives and fillers may be employed together with the baking powder composition of this invention as is known in the art.

Fresh dough, dry mixes and batter can be prepared from the leavening systems of this invention in the conventional manner as has been practiced in the art. Typically the ingredients may be dry mixed or prepared as a dough or batter. The dough or batter may be stored for conventional time periods (under refrigeration or frozen). The dry mix is employed to prepare fresh dough or batter by incorporating suitable liquids such as milk, water, eggs and solids such as shortening materials as is known in the art. It is obvious from the above that substitution or replacement of conventional sodium salts with the hemipotassium phosphate of this invention will reduce the amount of dietary sodium and fortify with potassium.

As is known in the art, the desired pH of the final baked good can be controlled by incorporating into fresh dough or batter leavening acids and alkaline carbonate sources normally employed for that purpose in the art. Generally, the pH of the final baked product ranges from about 5.5 to about 8.5, preferably from about 6.9 to about 7.2 (product dependent). The amount of alkaline carbonate material added should provide sufficient carbon dioxide. Typically there is included from about 0.3% by weight to about 3% by weight of the edible, alkaline agent, based upon the weight of the dry ingredients employed.

The typical uses and levels of leavening acid of this invention typically employed therein are provided in the table below. The listed baked goods are representative only and not intended to limit the invention in any way as other uses and baked goods can be made from the leavening system of this invention. The level of acid used with common, commercially available carbonate factors is an amount sufficient to neutralize and liberate carbon dioxide. The percentages shown are for the amount of hemipotassium phosphate of this invention as percent of solids to neutralize sodium bicarbonate.

| USES AND LEVELS OF USE - HEMIPOTASSIUM PHOSPHATES | |
|---|---|
| PRODUCT | WT. PERCENT |
| Self-Rising Flour-Like Product* | 0.2–1.1 |
| Self-Rising Corn Meal-Like Product* | 0.2–1.5 |
| Biscuit Mixes | 0.2–1.4 |
| Breading/Batter Mixes | 0.0–1.4 |
| Cake Mixes - Layer | 0.08–0.7 |
| Cake Mixes - Angel | 0.2–1.4 |
| Cake Doughnut Mixes | 0.07–0.7 |
| Cookie Mixes | 0.0–0.5 |
| Hush Puppy Mixes | 0.2–1.4 |
| Frozen Pancake Batter | 0.08–1.7 |
| Pizza Mixes | 0.04–0.9 |
| Refrigerated Doughs | 0.2–1.8 |
| Pancake Mixes | 0.2–1.5 |
| Frozen Biscuit Doughs | 0.2–0.7 |
| Muffins | 0.2–1.5 |
| Baking Powders | 2.9–30 |
| Crackers | 0.07–1.3 |
| Waffle Mixes | 0.2–1.5 |
| Frozen Cake Batter | 0.08–0.5 |

*Hemipotassium phosphate is not currently listed in the standard of identity for Self-Rising Corn Meal and Flour.

The moisture content of the fresh doughs and batters of the present invention generally range from about 5% by weight to about 130% by weight, based upon the weight of the dry ingredients. The moisture content will vary, dependent upon the ultimate utility of the dough or batter as to whether it may be employed to prepare cookies, biscuits, cakes, etc.

Baking times of the fresh doughs or batter of this invention are generally within the baking times generally known in the art with respect to the use of previously known leavening systems. It is typical that various mixes of fresh dough or batter will require different baking times considering as well the baking characteristics of the ovens employed. Typical baking times range from 7 to 15 minutes for cookies and longer periods for biscuits and other baked goods. The doughs or batters of the present invention are formed into pieces or deposited in conventional manner, using known bakery equipment such as wire cutting devices, rotary cutters, reciprocating cutters, and the like.

Typically, fresh dough and batter are prepared as in the prior art from flour, shortening, sugar, optionally emulsifiers and preservatives and from about 0.04% by weight to about 2.0% by weight of the leavening acid of this invention and appropriate levels of a carbonate source. Other optional ingredients, of course, can be included as is well known in the art.

The fresh doughs and batters of the present invention can optionally include many substances known in the art to be added to fresh dough and batter including bulking agents such as dietary fiber and hydrocolloides, corn fiber, soy filtrate, wheat bran, and apple tomace fiber (dehydrated and freeze dried) as exemplary of dietary fibers.

Texturizing and flavoring ingredients conventionally used in the production of baked goods may be employed in the novel doughs of this invention. The amounts employed are generally comparable to those used in the conventional formulation so as to achieve satisfactory mouthfeel, texture and taste. Typical amounts of conventional texturizing and flavoring ingredients used in the production of baked goods are in the range of from about 5% by weight up to about 25% by weight of the fresh dough or batter. Other additives such as sweeteners, etc. can also be employed in combination with the novel leavening system of this invention.

The following non-limiting examples illustrate the preparation of compositions useful in the process of this invention. In these examples percent is expressed as percent by weight unless otherwise noted.

DESCRIPTION OF THE PREFERRED EMBODIMENTS

EXAMPLE 1

Into a suitable container were placed 581 g of mono potassium phosphate and 493 g of concentrated phosphoric acid (85%). The mixture was agitated by means of a power mixer for a period of 5–10 minutes resulting in a viscous liquid. The liquid was then placed in an oven heated to a temperature in the range of 190° C. to about 200° C. After heating the liquid in the oven for a time in the range of from 1.5 to 2 hrs., the temperature of the liquid reached 120° C. at which temperature it was removed from the oven. The liquid was again subjected to vigorous agitation by means of a power mixer whereupon crystals formed as the liquid cooled by air convection. No external cooling was applied. Crystals continued to form during cooling and when reaching a temperature in the range of from about 25° C. to about 40° C. the material became a free flowing powder.

The powder was analyzed (ASTM D-2761) and found to have the following analysis as percent by weight:

| | |
|---|---|
| Trimetaphosphate | 0.10 |
| Tripolyphosphate | 0.08 |
| Pyrophosphate | 2.20 |
| Potassium Orthophosphate | 97.62 |
| Recovery | 99.21 |
| $P_2O_5$ | 60.67 |

An aqueous solution (1%) of the above described composition indicated a pH of 2.24 and loss on drying at 110° C. was 0.07%

EXAMPLE 2

The hemipotassium phosphate of this invention was tested as the acid factor in a leavening system of a pancake batter. A pancake batter was prepared as follows:

To a bowl was added about 180 g of Roland Pancake Base Mix. Separately, 3.94 g of sodium bicarbonate and an amount of leavening agent shown below in Table I were placed into a tared boat. The mixture of leavening acid and soda were sprinkled over the mix and incorporated with a whisk. Then 197.6 g of water were added to the mix and blended with a whisk.

The leavening acid employed in each sample tested is listed below:

TABLE I

| Sample No. | Leavening Acid | Neutralizing Value | Grams |
|---|---|---|---|
| 1 | Hemipotassium Phosphate | 140 | 2.79 |
| 2 | Citric Acid | 153 | 2.57 |
| 3 | Hemipotassium Phosphate | 140 | 2.81 |
| 4 | Hemipotassium Phosphate | 105 | 3.75 |
| 5 | Citric Acid | 131 | 3.01 |

In the pancake bake test a level #24 scoop of batter was employed to make pancakes for the tests reported in Table II below. The batter was poured onto a heated griddle maintained at 375° F. making eight pancakes. The pancakes were baked for 1.5 minutes and then turned over and baked for an additional 1.5 minutes. After baking they were removed from the griddle and evaluated.

The texture of the pancakes is reported in Table II below. To determine texture, a stack of 3 pancakes were subjected to a probe traveling at 1.5 mm/sec. under a weight of 212 g. The distance the probe became embedded into the stack of pancakes under said weight was measured in millimeters (Texture). Texture, in turn, is related to tenderness of the baked good which is an indication of the amount of leavening. The greater the texture number, the greater the tenderness. A texture of at least 9.0 mm, preferably at least 10.0 mm, is considered satisfactory leavening. The above mentioned test results and data appear in Table II below wherein texture is reported in mm.

A sample of the pancake batter was also taken to test volume increase without heating. Into a 100 ml graduated cylinder was added about 50 ml of the batter. The volume in the cylinder was noted after 30 minutes to determine whether there was any expansion. The observed initial volume in the graduated cylinder is subtracted from the volume observed at 30 minutes. The difference is divided by the initial volume to determine the percentage of expansion at 30 minutes. The percentage expansion in the graduated cylinder is also shown in Table II below.

The specific volume of the pancakes was determined by dividing the weight by the volume. Also, the "spread" of the pancake was determined by dividing the diameter by the height of the pancake.

TABLE II

| Sample No. | Expansion | Spread | Texture | Sp. Vol. | pH |
|---|---|---|---|---|---|
| 1 | 20 | 10.89 | 14.2 | 2.16 | 7.0 |
| 2 | — | 9.96 | 9.18 | 1.98 | 6.9 |
| 3 | — | 7.92 | 13.12 | 1.66 | 7.4 |
| 4 | — | | 12.91 | 1.73 | 6.9 |
| 5 | — | | 8.23 | 2.29 | 6.7 |

EXAMPLE 3

The product of Example 1 was employed as the acid factor in a leavening system of an angel food cake mix. To this mix was added sodium bicarbonate, Grade 2, the product of Example 1, and monocalcium phosphate. To this dry mix was added water and the mixture was blended to a uniform consistency. After scraping down the sides and bottom, the batter was mixed for an additional minute at the same speed. Samples were taken for determination of specific gravity and volume increase without heating, then 235.8 g of batter were deposited in 10 cupcake forms of a prepared pan with liner. A graduated cylinder was filled to 72 mm at room temperature and after 30 minutes an expansion of 4.2% was observed. The cupcakes were baked for 33 minutes in an oven at 350° F. The baked cupcakes were then taken from the oven and allowed to cool before evaluation. Specific gravity of the batter was determined to be 0.4947 g/cc. The specific volume of the cupcake (rapeseed) was 3.57 cc/g. To determine texture, a single cupcake was subjected to a probe traveling at 1.5 mm/sec under a weight of 212 g. The distance the probe became embedded into the center of the cupcake under said weight was measured in millimeters. Texture was 10.58 mm at the center of the cupcake. The pH of the cake was found to be 7.0. The crust was golden brown with nice cracks with air cell openings and good bounce. The crumb exhibited fine cell structure with medium cell walls. The taste was sweet and typical of angel food cake.

EXAMPLE 4

The procedure of Example 3 was repeated with the exception that 1.26 g of citric acid (N.V. 153) was employed in place of hemipotassium phosphate. Average weight of 10 cup cakes was 23.11 g. Specific gravity of the batter was determined to be 0.4469 g/cc. The specific volume of the cupcake (rapeseed) was 3.55 cc/g. To determine texture, a single cupcake was subjected to a probe traveling at 1.5 mm/sec under a weight of 212 g. The distance the probe became embedded into the center of the cupcake under said weight was measured in millimeters. Texture was 12.83 mm at the center of the cupcake. The crust was light golden brown with some cracks and with air cell openings and good bounce. The crumb exhibited medium cell structure with medium cell walls. The taste was sweet and typical of angel food cake with a slightly more tender bite than in Example 3.

Although the invention has been described in terms of specific embodiments which are set forth in considerable detail, it should be understood that this description is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A leavening composition comprising a carbonate factor and hemipotassium phosphate.

2. The leavening composition of claim 1 wherein the carbonate factor is sodium bicarbonate.

3. The leavening composition of claim 1 wherein the carbonate factor is selected from the group consisting of potassium bicarbonate, ammonium bicarbonate and stabilized x-ray amorphous calcium carbonate.

4. A process for leavening a fresh, refrigerated or frozen dough product which comprises mixing with flour, water and shortening a leavening system comprising a carbonate factor and hemipotassium phosphate.

5. A process of claim 4 wherein the carbonate factor is selected from the group consisting of sodium bicarbonate, stabilized x-ray amorphous calcium carbonate, ammonium bicarbonate and potassium bicarbonate.

6. The process of claim 4 wherein the carbonate factor is sodium bicarbonate.

7. A fresh, refrigerated or frozen dough product comprising a mixture of flour, water, shortening, and leavening system comprising a carbonate factor and hemipotassium phosphate.

8. A fresh, refrigerated or frozen dough product of claim 7 wherein the carbonate factor is sodium bicarbonate.

9. A fresh, refrigerated or frozen dough product of claim 8 wherein the carbonate factor is selected from the group consisting of potassium bicarbonate, ammonium bicarbonate and stabilized, x-ray amorphous calcium carbonate.

10. A refrigerated dough of claim 9 selected from the group consisting of cracker dough, cookie dough, biscuit dough, and pizza dough.

11. A fresh, refrigerated or frozen batter product comprising a mixture of flour, a suitable liquid, shortening, and a leavening system comprising a carbonate factor and hemipotassium phosphate, wherein said hemipotassium phosphate is produced by the reaction of monopotassium phosphate or monohydrate thereof with a large molar excess of phosphoric acid in a mixture at elevated temperature and then subjecting said mixture to vigorous agitation while allowing said mixture to cool at ambient temperature whereby said hemipotassium phosphate product is formed.

12. A batter product of claim 11 comprising a frozen batter selected from the group consisting of pancake, cake and muffin batters.

13. A fresh, refrigerated dry mix product comprising a mixture of flour, shortening, and leavening system comprising a carbonate factor and a hemipotassium phosphate, wherein said hemipotassium phosphate is produced by the reaction of monopotassium phosphate or monohydrate thereof with a large molar excess of phosphoric acid in a mixture at elevated temperature and then subjecting said mixture to vigorous agitation while allowing said mixture to cool at ambient temperature whereby said hemipotassium phosphate product is formed.

14. A leavened baked good wherein the leavening system comprised a carbonate factor and hemipotassium phosphate.

15. A leavened baked good of claim 14 selected from the group consisting of cakes, pancakes, hush puppies, cookies, waffles, pizza, muffins, crackers and biscuits.

16. A dry flour mix comprising a carbonate factor and hemipotassium phosphate.

17. A dry mix of claim 16 wherein the carbonate factor is a bicarbonate.

18. A dry mix of claim 17 wherein the bicarbonate is sodium bicarbonate.

19. The dry mix of claim 16 which further comprises shortening.

20. A dry mix of claim 16 wherein the carbonate factor is selected from the group consisting of potassium bicarbonate, ammonium bicarbonate and stabilized, x-ray amorphous calcium carbonate.

21. A baking powder comprising a bicarbonate source, hemipotassium phosphate and an inert filler.

22. A baking powder of claim 21 wherein the inert filler is corn starch.

23. A baking powder of claim 21 wherein the bicarbonate source is selected from the group consisting of sodium bicarbonate, potassium bicarbonate, ammonium bicarbonate and stabilized x-ray amorphous calcium carbonate.

24. The product of claim 11 wherein said elevated temperature is in the range from about 100° C. to about 195° C.

25. The product of claim 13 wherein said elevated temperature is in the range from about 100° C. to about 195° C.

26. A process for preparing a fresh, refrigerated or frozen batter or dough product which comprises admixing flour, a suitable liquid, shortening, and a leavening system comprising a carbonate factor and hemipotassium phosphate whereby said fresh, refrigerated or frozen batter product is prepared.

27. A process for preparing a fresh, refrigerated dry mix product which comprises admixing flour, shortening, and a leavening system comprising a carbonate factor and crystalline hemipotassium phosphate whereby said dry mix product is prepared.

28. A fresh, refrigerated or frozen batter product or dough comprising a mixture of flour, a suitable liquid, shortening, and a leavening system comprising a carbonate factor and hemipotassium phosphate.

29. A fresh, refrigerated dry mix product comprising a mixture of flour, shortening, and a leavening system comprising a carbonate factor and a hemipotassium phosphate.

* * * * *